United States Patent [19]
Bullitt et al.

[11] Patent Number: 6,101,333
[45] Date of Patent: Aug. 8, 2000

[54] METHOD AND APPARATUS FOR ACQUIRING ELECTRONIC AND/OR PHOTOGRAPHIC IMAGES

[75] Inventors: Julian G. Bullitt, Waban; William T. Plummer, Concord; Jon Van Tassell, Winthrop; George D. Whiteside, Lexington, all of Mass.

[73] Assignee: Polaroid Corporation, Cambridge, Mass.

[21] Appl. No.: 09/133,661

[22] Filed: Aug. 12, 1998

Related U.S. Application Data

[60] Provisional application No. 60/055,663, Aug. 14, 1997.

[51] Int. Cl.[7] .................................................. G03B 15/03
[52] U.S. Cl. .......................... 396/61; 396/65; 396/168; 396/187; 348/64; 348/366; 348/371
[58] Field of Search ................................ 396/61, 429, 65, 396/67, 166, 168, 161, 187, 188; 348/64, 362, 363, 366, 370, 371

[56] References Cited

U.S. PATENT DOCUMENTS

| | | | |
|---|---|---|---|
| 4,130,357 | 12/1978 | Erlichman, et al. | 354/241 |
| 4,593,312 | 6/1986 | Yamasaki | 358/909 |
| 4,647,975 | 3/1987 | Alston, et al. | 358/213 |
| 4,742,369 | 5/1988 | Ishii et al. | 354/441 |
| 4,751,583 | 6/1988 | Levine | 358/256 |
| 4,788,565 | 11/1988 | Masuda et al. | 354/75 |
| 4,881,127 | 11/1989 | Isoguchi et al. | 358/213.19 |
| 4,951,073 | 8/1990 | Slavitter | 354/113 |
| 5,327,193 | 7/1994 | Date, et al. | 354/435 |
| 5,486,861 | 1/1996 | Miyamoto, et al. | 348/362 |
| 5,546,121 | 8/1996 | Gotanda et al. | 348/64 |
| 5,867,741 | 2/1999 | Maruyama et al. | 396/187 |

FOREIGN PATENT DOCUMENTS

| | | | |
|---|---|---|---|
| 38 18 788 A1 | 12/1989 | Germany | H04N 5/225 |
| 196 37 629 A1 | 3/1998 | Germany | G03B 3/04 |
| 1-174175 | 7/1989 | Japan | H04N 5/225 |
| 1-266516 | 10/1989 | Japan | G03B 9/70 |
| 7-111616 | 4/1995 | Japan | H04N 5/238 |
| WO 94 30009 | 12/1994 | WIPO . | |

OTHER PUBLICATIONS

International Search Report PCT/US 98/16796.
PCT International Search Report, dated Mar. 29, 1999, PCT/US 98/16796.

*Primary Examiner*—W. B. Perkey
*Attorney, Agent, or Firm*—Leslie Payne

[57] ABSTRACT

A method and apparatus are disclosed whereby generally matched exposures for at least first and second photoresponsive materials generally concurrently can be obtained, wherein the first photoresponsive material is more photoresponsive than the second.

19 Claims, 6 Drawing Sheets ional application Ser. No. filed Aug. 14, 1997, and accorded Ser. No. 60/055, 663.

METHOD AND APPARATUS FOR ACQUIRING ELECTRONIC AND/OR PHOTOGRAPHIC IMAGES

CROSS REFERENCE TO RELATED APPLICATION

The present invention is related to provisional application Ser. No. filed Aug. 14, 1997, and accorded Ser. No. 60/055, 663.

BACKGROUND OF THE INVENTION

The present invention relates generally to methods, apparatus, and systems for selectively acquiring electronic and/or photographic images in an imaging apparatus. More specifically, the invention relates to methods, apparatus, and systems for generally simultaneously matching the exposure of a solid-state sensor for electronic image acquisition with the exposure of a photographic film, especially during a pulse of transient illumination.

It is well-known in the art to effectively capture generally simultaneously a scene image on two different types of imaging materials or devices, such as set forth in U.S. Pat. Nos. 4,742,369; 4,751,583; 4,788,565; 4,951,073; and, 5,546,121. For instance, U.S. Pat. No. 4,788,565 is related to a composite camera comprised of a video camera and a still film camera together with a strobe device wherein an image-pickup device, such as a CCD, employed for the video has a substantially high photosensitivity so that images can be picked up in the dark while the still film image cannot be picked-up due to its lower photosensitivity, unless assisted by a strobe. The patent teaches use of a system wherein the strobe is fired synchronously in response to the film image pickup operation and includes means in the video system for modifying the video image data picked-up at a timing of the strobe flash operation for avoiding the influence of the high intensity strobe light on the CCD. In this regard, while the flash is fired the CCD is influenced by either a dummy signal or by lowering the gain of the CCD during firing.

U.S. Pat. No. 4,593,312 describes a system wherein a camera captures an image of a subject on photosensitive film and a video camera using a solid-state electronic image sensing device is used for obtaining substantially identical images of the subject as does the film camera under a single flash or strobe. Operation of the film camera and strobe light emission device is synchronized to the video camera using as a reference the vertical synchronizing signal of the video acquisition so that the emission of the flash occurs during the vertical blanking period of the video.

While there exists a variety of approaches for obtaining correctly exposed images for both solid-state image sensors in combination with a photographic apparatus there is a continuing desire to provide for an improved electronic apparatus, and method for providing generally matching exposures for simultaneous photographic and electronic image acquisition; particularly whenever using an electronic strobe. In addition, there is a desire to provide for an improved exposure control module for solid-state image sensing as well as an approach for mounting a circuit board carrying a sensor to the module in an expeditious and, therefore, economical manner.

SUMMARY OF THE INVENTION

In accordance with the present invention, provision is made for an improved apparatus, system, and method of obtaining generally matched exposures for each of at least first and second photoresponsive materials generally concurrently; particularly whenever the scene is illuminated, in part, by a pulse of transient or flash illumination. In one illustrated embodiment of the method, provision is made for the first photoresponsive material being a photographic film material, while the second photoresponsive material is a solid-state imaging means. The method comprises the steps of: measuring a scene for obtaining photodata of the scene; determining a preselected balance between the percentage of strobe illumination and ambient illumination for a scene subject to be exposed; determining an exposure value for the scene subject for the first photoresponsive material in accordance with the preselected balance which balance includes a percentage of transient illumination to be contributed to the exposure; selecting an effective aperture for the second photoresponsive material which aperture is a function of a preselected ratio of areas between it and the first effective aperture for the first photoresponsive material, wherein the effective aperture of the second photoresponsive material is generally equal to or proportionally larger than the effective aperture for the first photoresponsive material; determining the equivalent exposure time for the second photoresponsive material given the selected effective aperture of the second photoresponsive material; commencing an exposure interval for the first photoresponsive material for effecting exposure of the first photoresponsive material; firing a pulse of transient illumination at a selected effective aperture for the first photoresponsive material; commencing an exposure interval for the second photoresponsive material by integrating scene illumination after commencement of the pulse of transient illumination at a point based on the percentage of transient illumination to be contributed to the first photoresponsive material and the preselected ratio of effective apertures; and, terminating the exposure intervals respectively for the first and second photoresponsive materials so that they generally match with respect to each other.

In an illustrated embodiment, provision is made for an electronic exposure control module or mechanism as well as method of operation. Preferably, the module includes a housing assembly; a solid-state imaging sensor means mounted within the housing assembly; an exposure aperture assembly; and, a capping blade assembly. The module is adapted to operate independently or in combination with the photographic subsystem of the camera, whereby whenever in the latter condition, simultaneous and generally matched exposure control of the film and solid-state image sensor occurs.

In another illustrated embodiment, provision is made for advantageously mounting the circuit board carrying the sensor to the module housing expeditiously requiring significantly reduced time and effort and consequently expense.

The above and other objects and advantages of the present invention will become apparent from the following more detailed description when taken in conjunction with the attached drawings in which like parts are designated by like reference numerals throughout the several views.

DETAILED DESCRIPTION

Figure 1:
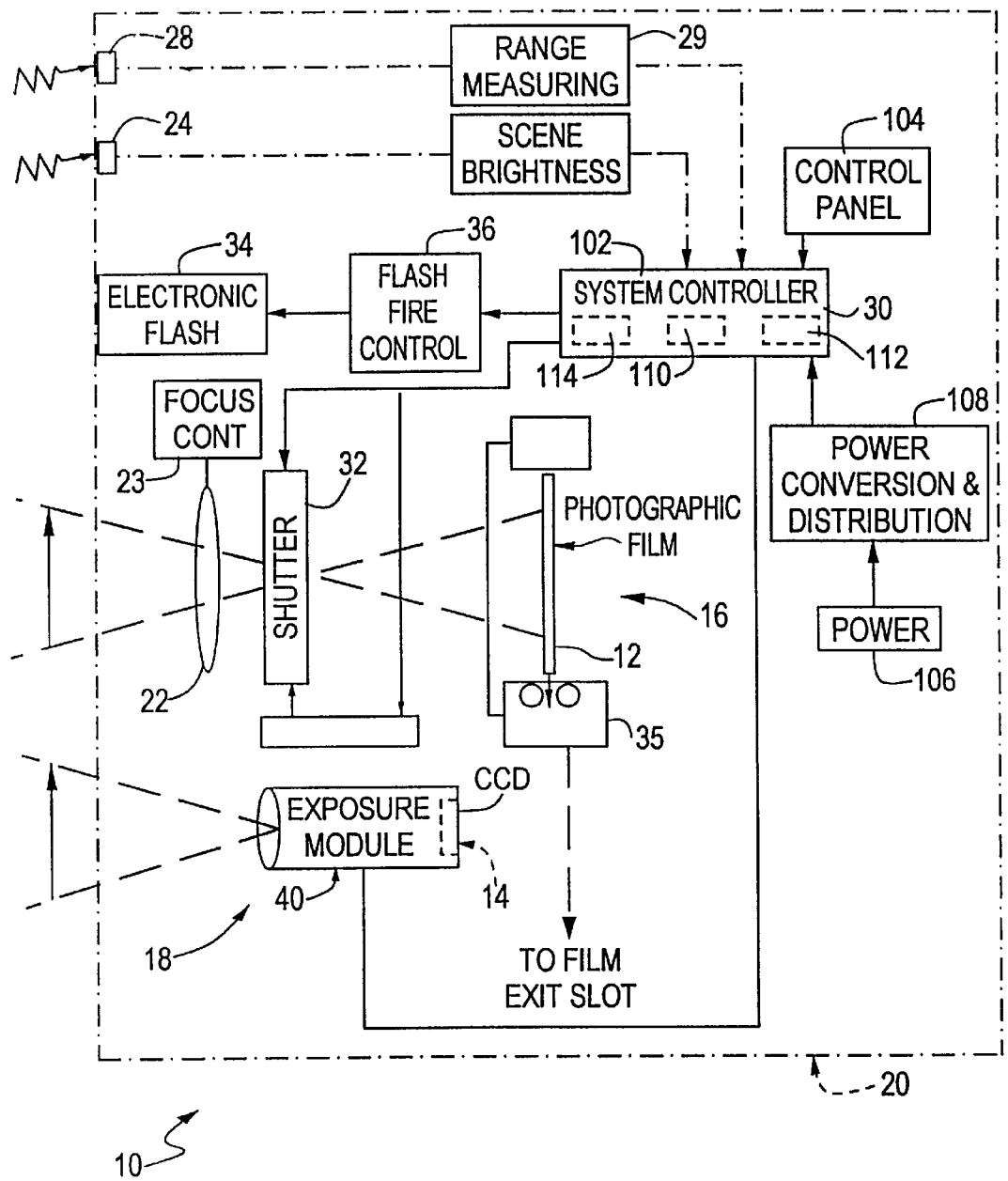
FIG. 1 illustrates a block diagram representing a hybrid electronic and photographic camera of the present invention.

Reference is made to FIGS. 1–5 for illustrating one preferred embodiment of a hybrid multiple imaging acquisition apparatus or camera 10 made in accordance with the principles of the present invention. The camera 10 operates, preferably, as a hybrid electronic imaging and/or photographic imaging camera. That is, it is operable for capturing either simultaneously or independently scene images onto a photographic film 12 at a first location within the camera, and/or a solid-state image sensor assembly 14 at a different location within the camera. The amount of light representing the scene at the solid-state sensor during exposure is, preferably substantially the same as or matched to the amount of light representing the scene on the film during exposure. It will be understood that the photoresponsive characteristics of the film and solid state sensor are different from each other, thereby requiring different exposures for each and the following description will explain how this is accomplished. In the preferred embodiment, the photographic material is of the self-developing type, such as commercially available from Polaroid Corporation. In fact, many components of the photographic subsystem as will be described are components of known self-developing cameras developed by Polaroid Corporation. While the present invention illustrates the use of film and a solid-state sensor for image acquisition, it will be appreciated that the present invention envisions use of a variety of first and second photoresponsive materials, each having different spectral response characteristics from each other. Essentially, the camera 10 includes a photographic imaging subsystem 16 and an electronic imaging subsystem 18. Initial reference is made to the photographic imaging subsystem.

In the camera 10, there is both sensor and film exposures. Both the sensor and film exposures can occur individually or simultaneously. The camera will have a single photometer system, reading IR light to control the strobe and visible light to control ambient exposure, a single quench strobe, and a single ranging system such as IR triangulation. These elements will be shared by the sensor and film exposure systems. Other than these shared components, the sensor and film optical path, shutter mechanism, focusing mechanism and other elements will be separate.

PHOTOGRAPHIC IMAGING SUBSYSTEM

The photographic imaging subsystem 16 of the camera 10 includes components which are available in known cameras of the self-developing type and thus only those components of such a system considered necessary for understanding the present invention will be set forth herein. The camera 10 includes a suitable light-tight housing assembly 20 and lens assembly 22 which directs image forming scene light to the photographic film unit 12. In a preferred embodiment, the objective lens assembly 22 is of the auto-focusing type and thus, will set the objective lens focus condition to a setting corresponding to the determined camera-to-subject range under the control of a focus control system 23 which is controlled by a system controller. The auto-focusing system is a linear quintic focusing system of the type described in commonly-assigned U.S. Pat. No. 4,650,292 issued to Baker et al. which patent is incorporated herein as a part hereof.

A photocell 24 accepts image forming scene light directed thereto by a lens assembly and is operatively connected to a scene light measuring system in a system controller for measuring ambient scene brightness during both the pre-exposure interval and during the exposure interval in a known manner. An infrared ranging (IR) system 28 emits a beam of IR at the subject during pre-exposure and by means of triangulation determines the camera-to-subject range using a range determining system 29 which inputs the subject range to the system controller 30. In this embodiment, the IR system includes an infrared emitting diode and photoposition indicator device. Both the photographic and electronic imaging subsystems use the camera-to-subject range in a manner that will be explained in order to control exposure for both the photographic and electronic imaging modes. A variety of other ranging systems are contemplated by the present invention for determining a range signal.

A shutter-diaphragm mechanism 32 is included in the camera housing 10 for regulating the exposure of scene light to the film 12. The shutter mechanism 32 includes a dynamic aperture scanning shutter blade mechanism (not shown) which is driven by a reversible stepper motor operated in a closed loop manner under the control of a system controller 30. The scanning type shutter blade mechanism for use in controlling exposure of self-developing film is known; such as the type described in commonly assigned U.S. Pat. No. 4,354,748 issued to Grimes et al.; which is incorporated herein as a part hereof. Essentially, the shutter blade mechanism provides an aperture-interval value for each scene light level in keeping with, or in tracking relation to the exposure curve of the film to produce an image. The scanning blade system is provided with a pair of secondary apertures that admit scene light to the photocell 24 in correspondence with the scene light admitted to the focal plane during shutter movement during the different phases of an exposure cycle. The output from the photocell 24 is directed to an exposure control circuit in the system controller 30 which includes an integrator circuit that triggers upon reaching an integration level related to a desired exposure value or more precisely an aperture-interval value to terminate the exposure interval by returning the shutter blade elements back to their initial scene light blocking position. The desired aperture-interval value is determined in the present embodiment, by a combination of the scene brightness and subject ranging prior to the exposure interval commencing as will be described. Opening and closing of the shutter blade mechanism for effecting an exposure system is performed under the control of the system controller 30. The shutter blade mechanism operates so as to define an effective exposure aperture value which increases to a maximum value in a predetermined time.

Also included in the camera 10 is a film unit transport and processing system 35 which is of the type for advancing and processing the self-developing film units which are housed in the photographic subassembly. The system 35 is operable following exposure of a film unit in the camera to advance an exposed film unit from the exposure station to a processing station. The processing station includes pressure applying rollers which process each film unit following exposure and directs the film unit to a film exit slot in the housing.

An electronic flash or strobe 34 of the quench type is connected to the camera 10 and is operatively connected to and operated by a flash fire control 36 which is in turn connected operatively to the system controller 30. The quench strobe 34 provides flash means operable for producing pulses of illumination which are directed at the scene. The quench strobe includes a flash discharge tube, wherein a quench signal from the flash fire control 36 interrupts the light output from a flash tube. The amount of strobe light contributed occurs when the strobe is fired until it is subsequently quenched by a signal which is responsive to the detection and integration of reflected strobe light from the scene by the photocell in correspondence with the scene light admitted to the film plane as measured by the photocell. As will be explained, the quench strobe will be fired at an appropriate aperture defined by the scanning shutter blade corresponding to the camera-to-subject range and scene brightness and will be quenched at an appropriate time in correspondence to the subject range and scene brightness level during exposure.

The foregoing is a description of the photographic imaging side of the camera and the following will describe the electronic imaging side of the camera.

ELECTRONIC IMAGING SUBSYSTEM

Reference is made to FIGS. 2–5 for illustrating one preferred embodiment of an electronic exposure module 40 which is operable for controlling exposure of the electronic imaging subsystem. Included in the module 40 is the solid-state imaging sensor assembly 14 which includes a charge-coupled device (CCD) sensor 42. The CCD sensor 42 is similar to the CCD sensor present in the PDC-2000 electronic imaging digital camera which is commercially available from Polaroid Corporation; but the sensor 42 is modified for prolonging the period of time during which image clearing functions of that CCD are performed following initialization thereof, and by delaying the start of the image acquisition function of the CCD. Instead of acquiring the image at the opening of the blade, the image acquisition occurs in response to input from the system controller 30 during strobe burn as will be described; wherein basically the CCD starts the image acquisition mode during strobe burn if there is going to be a flash mode. If the ambient or non-strobe mode is used, the CCD sensor will commence image acquisition as a function of time based on signals from the system controller and terminate exposure of the sensor upon closing of the capping blade or shutter as explained. It will be appreciated that other solid-state digital imaging sensors are contemplated, such as a CMOS digital imaging sensor. In this embodiment, the image acquisition ability of the sensor occurring rapidly (i.e., microseconds) is advantageous when wanting to rid the sensor of extraneous light during its exposure particularly when a flash mode is being used. The CCD sensor in this embodiment functions as a so-called ½ electronic shutter, because while the sensor is activated to image acquisition electronically it requires the use of a mechanical system, such as a capping blade system to terminate the transmission of light to the sensor and thereby terminate exposure. In this regard, the present invention also contemplates the use of a so-called "full" electronic shutter, wherein exposure is commenced and terminated electronically in order to determine the exposure interval. This eliminates the need for mechanical arrangements, such as a capping blade arrangement or a disc as discussed below. One advantage of the ½ electronic shutter as opposed to the full electronic shutter is, however, the fact that it is significantly less expensive.

The electronic exposure module 40 includes a housing assembly 44 which houses the image sensing assembly 14. The image sensing assembly 14 includes the CCD 42 mounted on a circuit board 46 and is protected by a box 48 having an optically transparent window 50. The CCD sensor 42 can be, for example, about ⅓ inch along its diagonal with its geometric center on an optical axis 52. An optical assembly 54 is housed in a tubular extension of the housing assembly and defines the optical axis 52. The optical assembly 54 includes a one direction anti-aliasing filter 56; a blocking infrared filter 58; three-piece lens system 60; a fixed aperture plate 62 and a movable lens/aperture plate 64. The lens system 60 can be a four element lens system. The fixed aperture plate 62 includes an aperture 63 which is sized to effect exposure in one of the modes to be described. The module 40 includes a stepper motor 66 mounted on the housing assembly 44 and is operable for rotatably stepping a driving gear 68.

Continued reference is made to the lens/aperture plate 64 which is seen to include a plate pivotally mounted at 70 to the housing assembly 44 and is interposed between the optical assembly and the CCD. The plate 64 has an upper body portion with gear teeth 72 along a portion of its upper edge which drivingly mesh with the driving gear 68. The stepper motor 66 will step the aperture/lens plate 64 to discrete positions, whereat sensor apertures on the plate control the amount of light passing to the CCD sensor 42. The lens/aperture plate 64 includes a lower body portion 74 which in combination with the aperture plates 62 define a pair of sets of sensor apertures. One of the pair of sensor apertures includes a highlight aperture 76 and the aperture 63 defines the low-light aperture of the same set. The other set of sensor apertures include a low-light sensor aperture 78 and a high-light sensor aperture 80. A close-up lens plate 82 covers at least the apertures 78 and 80 to provide optical close-up features when such apertures are being used. Both high-light sensor apertures 76 and 80 have in the illustrated embodiment an f/11 aperture, while the low-light apertures 63 and 78 have an f/4 aperture. It will be appreciated that the aperture/lens plate can have a number of discrete apertures with corresponding f-numbers (e.g., f/8, f/11, f/12) thereby satisfying different imaging requirements for the camera; such as acceptable blur factors for images acquired by the imaging sensor. The reason two sets of apertures are provided is to allow the use of close-up features depending on subject range. Although a pair of sets of apertures are illustrated, the present invention contemplates that there can only one aperture on the aperture plate. If close-up features are not contemplated, the present invention prefers to have at least a pair of apertures to effect exposure control since with one aperture under high ambient light conditions the exposure control system may not close sufficiently fast enough because of the capping blade system which is being used. Also by the use of a smaller aperture in high light situations, improved image quality (depth of field) may be obtained.

Figure 2:
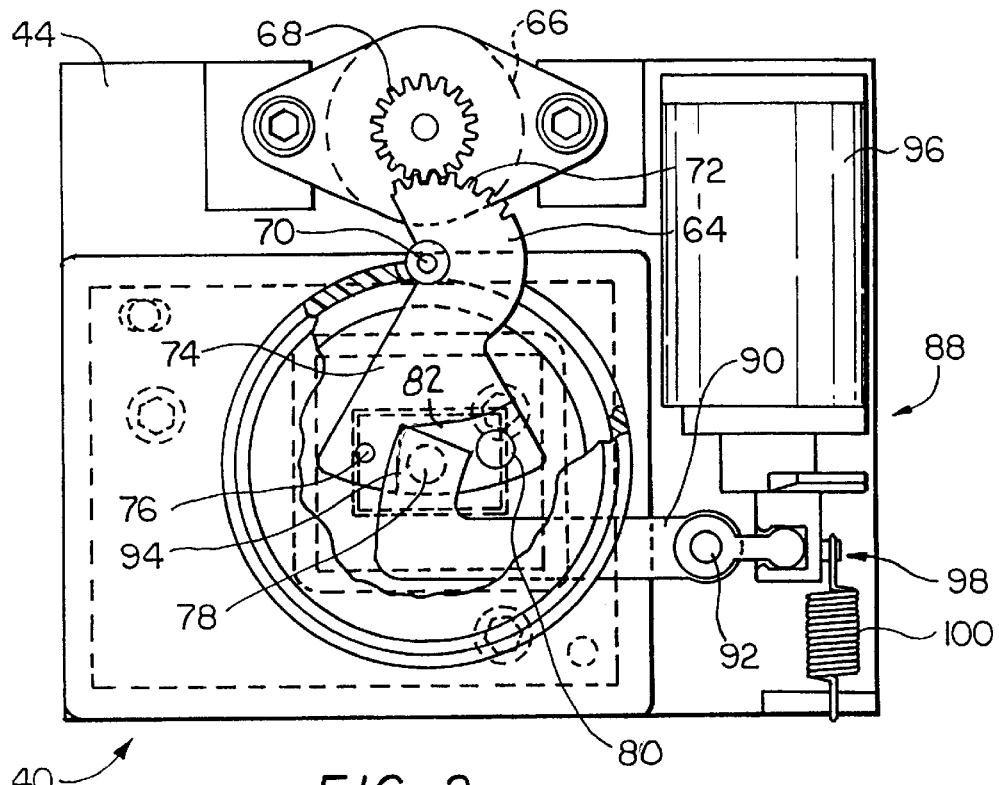
FIG. 2 illustrates a front elevational view of one embodiment of an electronic module of the present invention.
Figure 3:
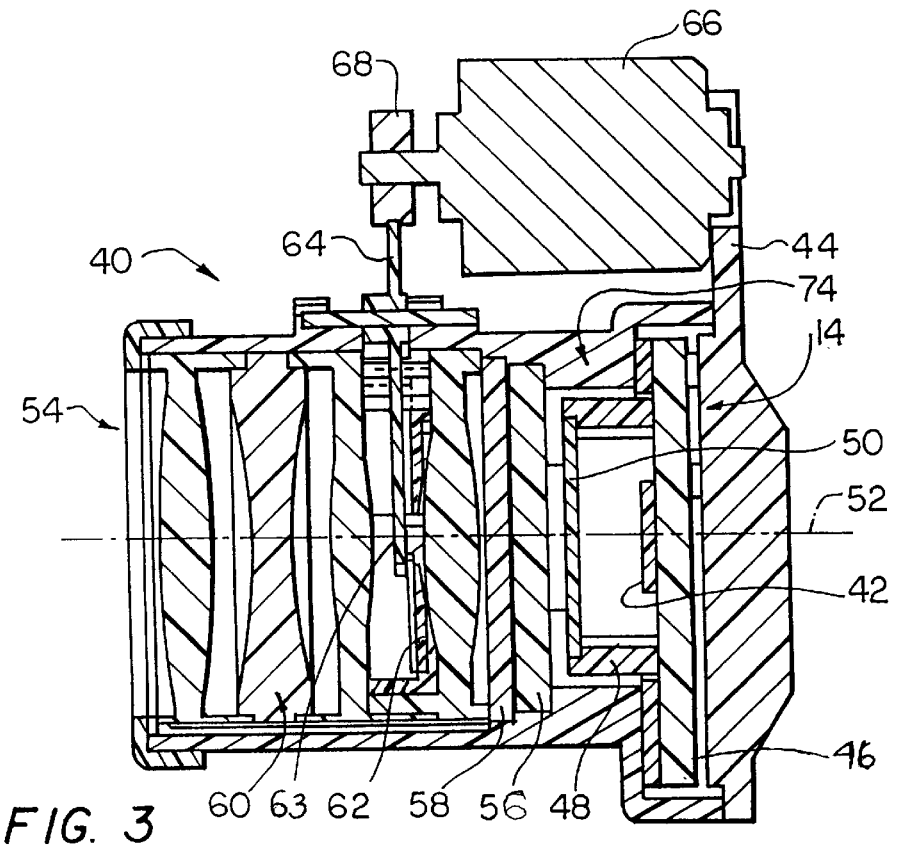
FIG. 3 illustrates a cross-sectional view of the electronic module of FIG. 2.
Figure 4:
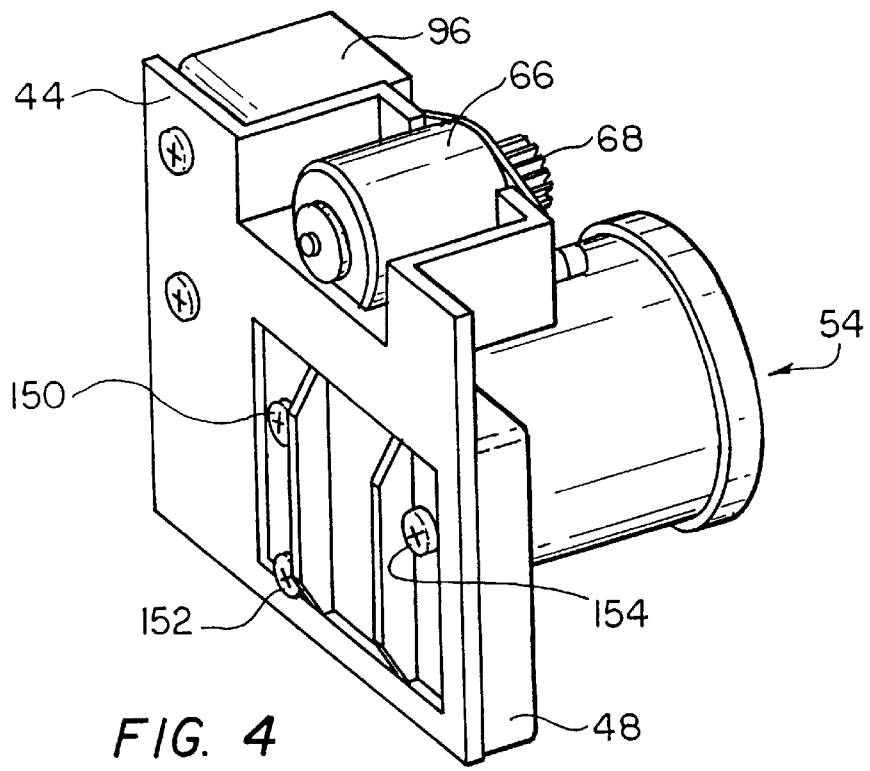
FIG. 4 illustrates a rear perspective view of the electronic module of FIGS. 2 and 3.
Figure 5:
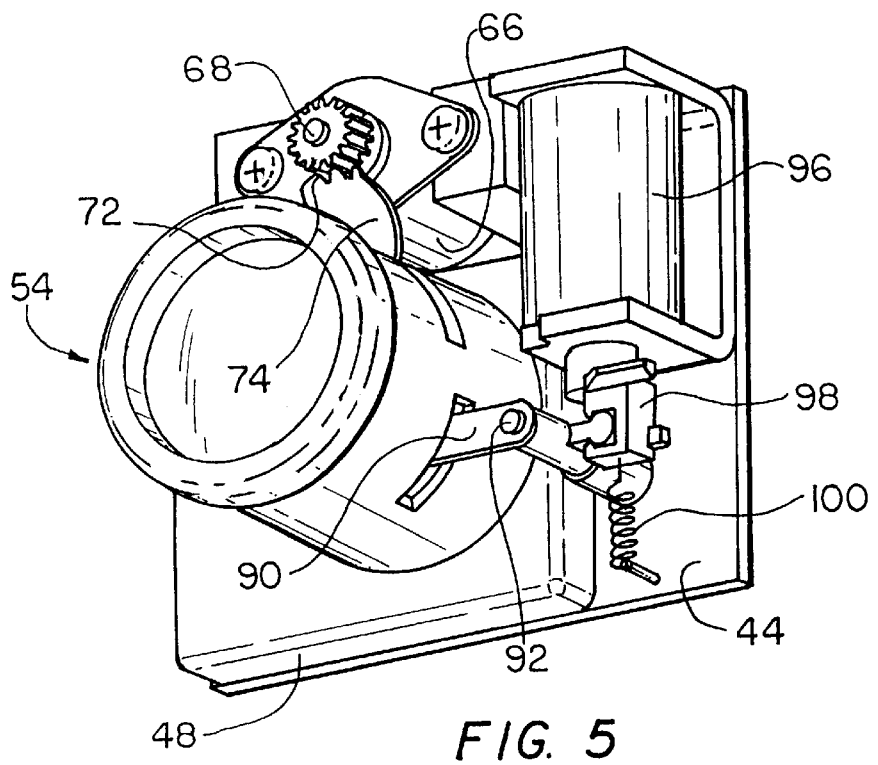
FIG. 5 illustrates a front perspective view of the electronic module of FIGS. 2–4.
Figure 6:
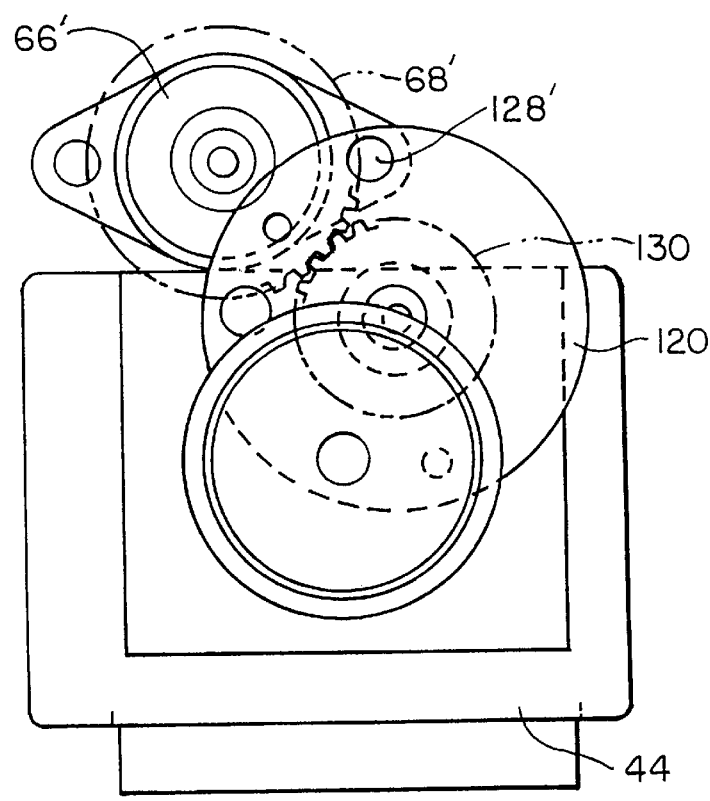
FIG. 6 illustrates a front elevational view of another preferred embodiment of an electronic module of the present invention.
Figure 7:
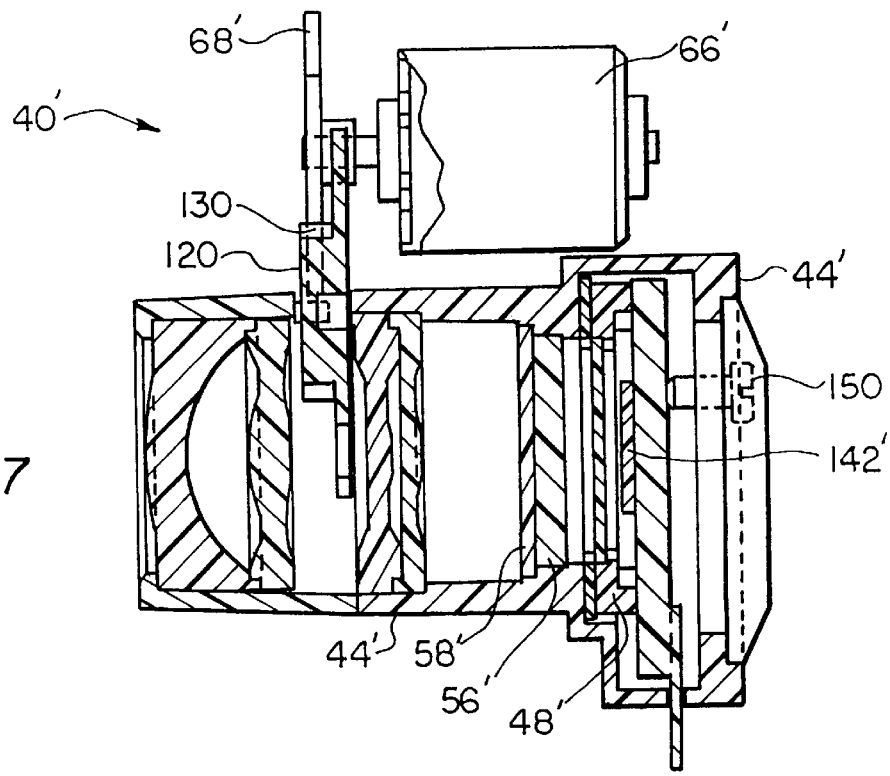
FIG. 7 illustrates a cross-sectional view of the electronic module of FIG. 6.
Figure 8:
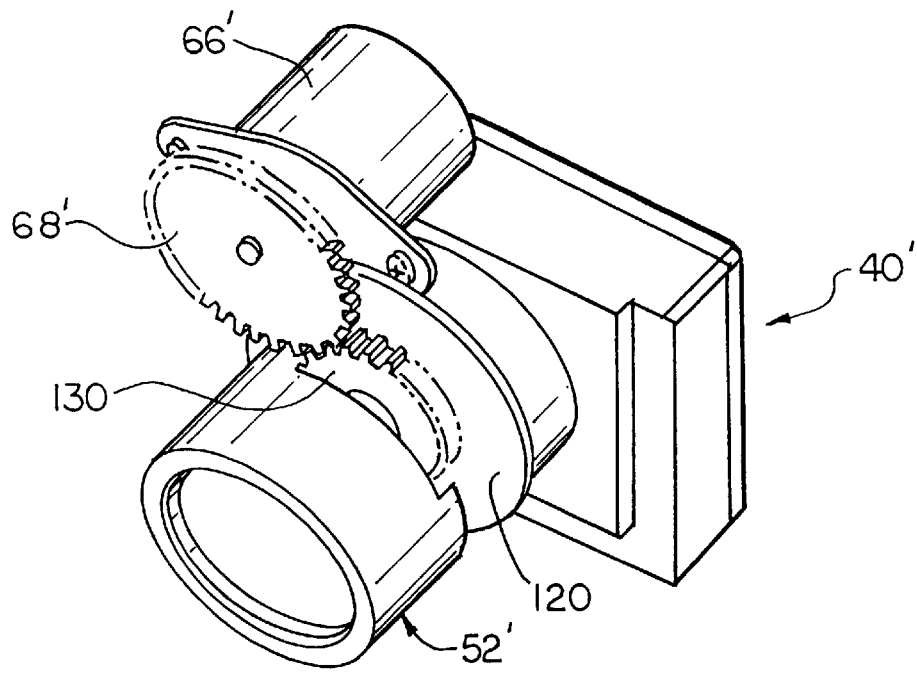
FIG. 8 illustrates a rear perspective view of the electronic module of FIGS. 6 and 7.
Figures 9A, 9B:
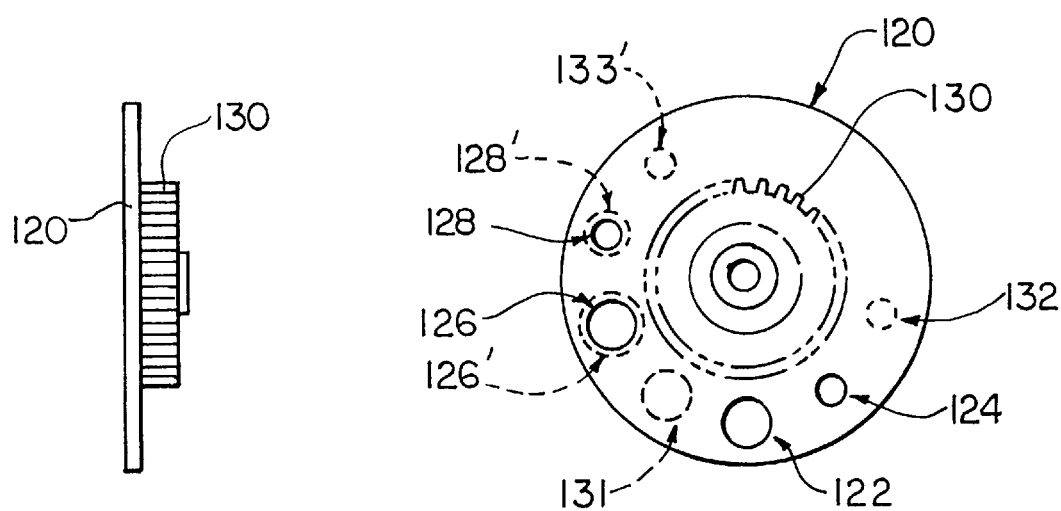
FIGS. 9A and 9B illustrate respectively elevational and side views of the shutter disc used in the electronic exposure module of FIGS. 6–8.
Figure 10:
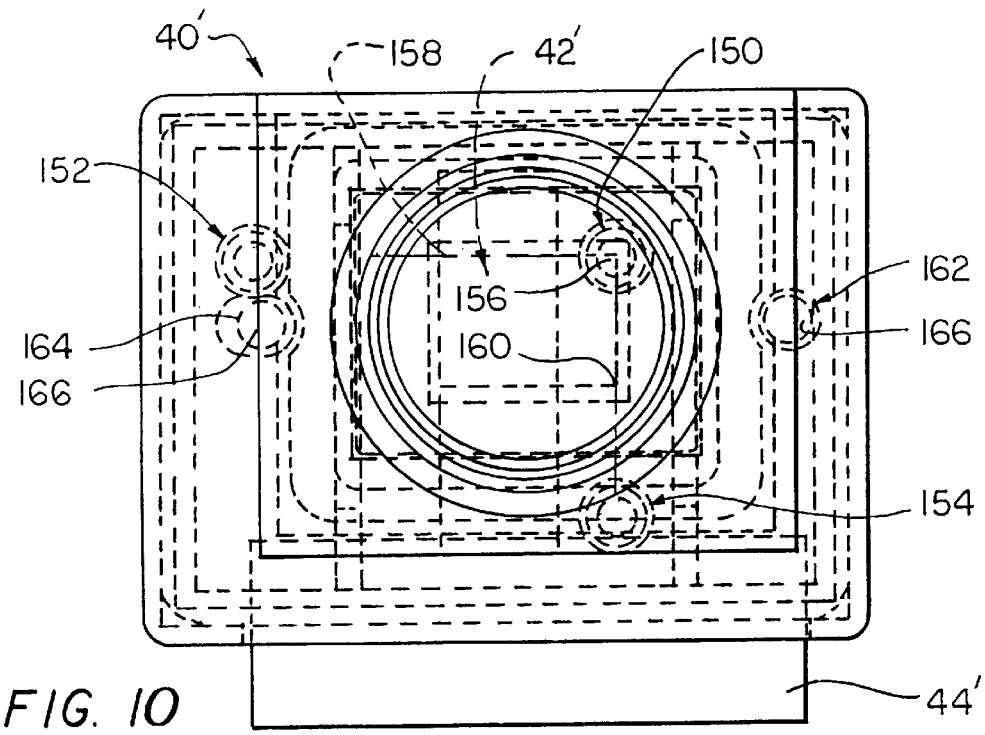
FIG. 10 illustrates diagramatically a method of mounting the circuit board and sensor to the module housing; and, FIG. 11 illustrates diagramatically a chart of the simultaneous operation of the photographic and electronic exposures during the strobe mode wherein there is a pulse of transient illumination with the pulse of transient illumination being enlarged as indicated by the encircled portion.

The stepper motor 66 will drive the lens/aperture plate 64 to one of three positions from the position depicted in FIG. 2. In two of the positions, either one of the apertures 76 or 80 will be positioned along the optical axis 52. For the fourth position, the stepper motor 66 drives the aperture/lens plate 64 to a position whereat no portion of the plate intercepts light along the optical axis 52, but the sensor aperture 63. Of course, the sensor aperture 78 can be repositioned to intercept the optical axis. The four-position movement of the plate simplifies some of the actuation of the plate to achieve the desired positioning of the noted sensor apertures along the optical axis Envisioned by the present invention are different actuation schemes for driving the lens/aperture plate. In this embodiment, each of the sensor apertures is effectively larger than corresponding ones of the photographic imaging apertures selected for exposure control of the photographic film. Stated differently, the equivalent sensor f-number will always be less than or equal to the equivalent f-number for the film in order to facilitate the obtaining of substantially equivalent exposures in a manner which will be described since there will always be excess light on the sensor side.

For effecting exposure of the image sensor using the CCD sensor 42 and for protecting the latter, provision is made for a capping blade assembly 88, wherein a capping blade 90 is pivotally mounted at 92 to the module housing assembly 44 for allowing pivotal movement between a capping position, as seen in FIG. 2, and an uncapping position. The capping blade 90 is relatively elongated and has a blocking distal end 94 which blocks scene light from striking the CCD sensor 42. The capping blade is normally maintained in the scene light blocking mode, whereby it prevents scene light from striking the CCD sensor 42, thereby protecting the latter from damage from ambient light and as well as for terminating exposure of the electronic imaging subsystem. A solenoid 96 mounted on the housing assembly 44 is energized, whereby retraction of its plunger pivots the capping blade 90 from its blocking condition to its unblocking condition through a linkage arrangement 98 coupled between one end of the capping blade and the plunger. Upon deenergization of the solenoid 96, a spring 100 will bias the capping blade back to its covering position.

The system controller 30 includes a logic circuit board 102 located within the camera 10. The logic circuit board 102 is a microcontroller circuit which receives electrical signals from the camera elements and, in turn, controls the camera cycle. The logic circuit board 102 includes a microprocessor (not shown) which is operable for decoding signals from, for instance, the range determining system 29 and the photocell 24 during the different modes of operation. The logic circuit 102 includes a conventional, electronically erasable memory section which includes three look-up tables, namely a look-up table 110 for control of photographic only imaging, a look-up table 112 for control of electronic imaging, and a lookup table 114 for control of both electronic imaging and photographic imaging. The look-up tables 110, 112 and 114, each employ combinations of the exposure parameters of subject range, flash mode selection, pre-exposure scene brightness information to define the desired memory cell address. The present invention contemplates other scene recognition parameters, such as scene brightness mapping for use in controlling exposure for both the ei and/or pi exposures. Hence, each cell stores photodata such as correct follow-focus, flash firing intervals for each and every different combination of these parameters as well as commencing the turn-on of the photocell during the electronic imaging mode. The logic circuit 102 in turn, controls a flash fire control circuit 36 to separately fire and quench the flash 34 during the exposure cycle. The flash fire control 36 includes a conventional strobe board for storing the required strobe charge and conventional trigger board (also not shown) for the flash lamp to separately turn the electronic flash on and off in accordance with appropriate signals. The logic circuit 102 also controls the exposure module 40 as more specifically set forth below as well as the focusing control and the shutter mechanism 32 together with the film advancing and processing system.

As depicted in FIG. 1, a control panel 104 is operatively coupled to the system controller 30 and includes, for example, membrane switches (not shown) such as off/on, flash mode select, electronic imaging only mode, photographic imaging only mode, exposure initiate, and a combined electronic/photographic imaging (ei/pi) mode. All such switches are connected to the system controller 30. Also, other camera functions are contemplated by which appropriate switches can be provided. The camera 10 including all the electronic components thereof can be operated by a source of power which may be an independent battery source 106 which is coupled to a power conservation circuit 108. The switch can be a two stage manual switch, which in its first stage, signals the logic circuit 102 to awaken the camera 10 including energizing the strobe 34. In its second stage, this actuator signals the logic circuit 102 to operate the camera 10 through an exposure cycle to be described. The actuator is operable to initiate an exposure cycle, then after a short period of inactivity, control the logic circuit 102 to automatically shut the camera down. Taken together, the flash switch and the electronic imaging and/or photographic imaging switches provide means operable for selecting various exposure parameters for the subsequent exposure cycle, and means for signaling these selections to the logic circuit 102.

Turning to FIG. 1, the off/on switch of the control panel 104 when on initializes all the system and camera components. In this regard, a pre-exposure cycle is initialized to perform pre-exposure photodata measurements, such as scene brightness and subject ranging. In this regard, the strobe will be charged to the desired value and refreshed if necessary by appropriate circuitry. The present inventions contemplates that other photodata measurements can be made prior to exposure so as to control the ultimate exposures of the film and/or sensor. The other photodata measurements include ranging and/or brightness mapping functions. The control panel 104 will also include a user selected flash mode switch 136, a photographic exposure only switch, an electronic imaging only switch, and a combined photographic and electronic imaging switch, all in connection to the logic circuit 102. While this embodiment describes user interfaces, the present invention contemplates that these functions can be controlled by a computer interface. However, the exposure sequencing to follow will be directed to matching the film and sensor exposures; particularly during the strobe mode.

OPERATION

Figure 11:
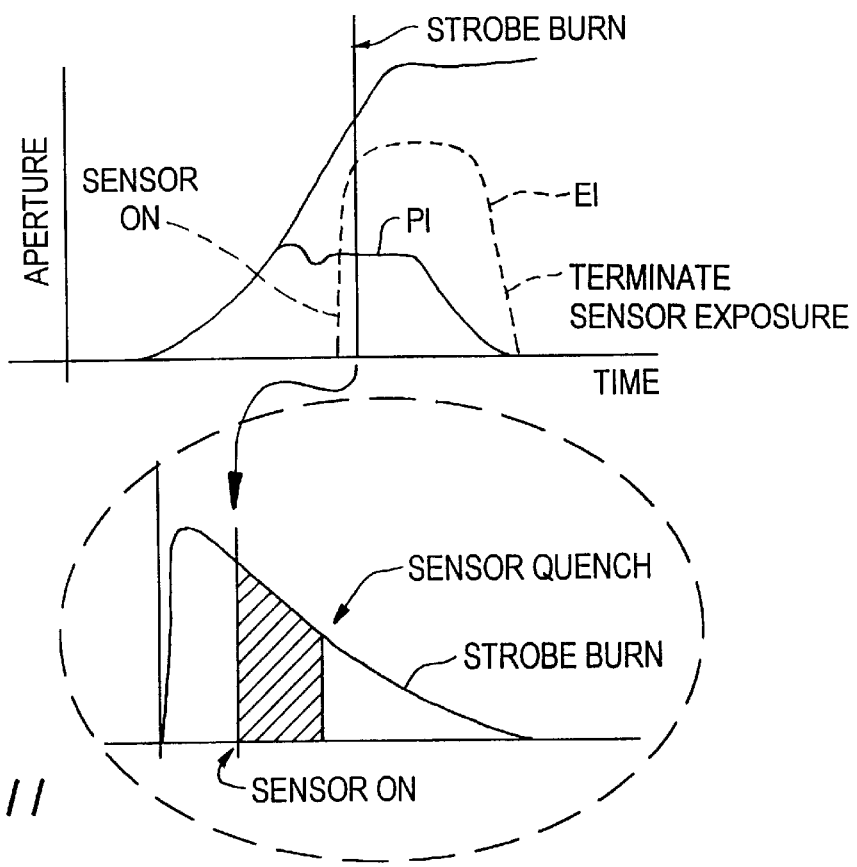

After having explained the construction of the camera, its operation is believed self-evident (see FIG. 11). There is no need to describe the photographic imaging mode only, since it is well-known. The system will operate as follows for a flash mode: the photometer 24 and the ranging system 28 will measure visible scene light and subject distance; respectively. The lookup table 112 determines the correct aperture and shutter speed of the shutter mechanism 32 for the film exposure as well as when the strobe 34 is fired. The lookup table, based on the pre-exposure measurements, calculates which sensor aperture on the lens/aperture plate is to be used and then operates the stepper motor 66 to move the lens/aperture plate to the desired position whereat the correct sensor aperture is placed in operative relationship with the CCD sensor 42. In this regard, the gain of the sensor is, of course, set. The sensor aperture selected is a sensor equivalent aperture which can be equal to or larger than the film equivalent aperture defined by the shutter mechanism; thereby providing more light to the sensor. At the beginning of film exposure, the film aperture defined by the shutter mechanism will open and then stop at a predetermined aperture. The sensor capping blade 90 will also open at this time, but the so called ½ electronic shutter will be in the off state. Once the film aperture defined by the shutter mechanism is fixed with respect to time, the strobe 34 will fire and then be quenched by integrating reflected scene light based on the film exposure requirements set by the look-up table. Based on the integration of scene light during strobe burn and how much larger the effective sensor aperture is relative to the effective film aperture, the lookup table determines when the CCD sensor 42 will be turned on for image acquisition during the strobe burn; thereby effectively getting rid of extraneous strobe light so that it does not adversely affect the sensor. An advantage of integrating scene light to determine when the sensor is operated to be in the image acquisition mode is that it compensates for the fact that strobe output can vary from cycle to cycle and especially over time. The film exposure will terminate based on the film requirements following the quenching of the strobe and closing of the shutter blade mechanism as is known. Since the electronic imaging exposure commences following the film exposure, it will terminate at a later point in time. The capping blade will again be operated to block scene light to the sensor 42 and thereby terminate the electronic imaging exposure wherein the integrated effective exposures for the electronic and photographic imaging are generally matched. One example of the dual imaging during the strobe mode is that if the desired strobe exposure is a 100% full exposure, and the selected sensor aperture is 1 stop larger than the corresponding equivalent film aperture, the CCD sensor 42 is turned on at 50% of a full integrated strobe exposure as measured by the photocell 23. If the desired strobe exposure is 25% of a full exposure and the sensor aperture is 1 stop larger than the film aperture, the sensor will be turned on at 12.5% of a full strobe exposure. This latter condition is more of a concern, due the sensor turn on taking place at the early stage of the strobe burn, and the short time between sensor turn on and quench. After the completion of the strobe exposure, the film shutter will close to satisfy the film exposure requirements. Since the sensor ambient exposure started later than the film's, due to the sensor turn on occurring during the strobe burn, the sensor shutter will probably close later than the film's, depending on the equivalent aperture ratio. In this regard, the capping blade will move from its unblocking condition back to the blocking condition relative to the CCD sensor 42, thereby terminating exposure of the electronic image acquisition. It will be appreciated that during non-flash or ambient mode conditions, the foregoing operation of the ei/pi modes holds except that the opening and closing of the exposure intervals are based on time and there is no integration of scene light to quench the strobe as well as commence image acquisition of the strobe.

Reference is made to FIGS. 6–10 for illustrating another preferred embodiment of an electronic exposure module 40' of the present invention in which like parts will be designated by like reference numerals as with the previous embodiment with, however, the addition of a prime marking. This embodiment of the electronic exposure control module 40' differs from the preceding embodiment insofar as the capping blade and associated solenoid have in essence been replaced by an aperture/lens disc 120 which is indexed under the control of the stepper motor 66', whereby the latter is operable for positioning an appropriate sensor aperture in the static mode over the CCD sensor 42' as well as effectively function as a shutter mechanism for commencing and terminating electronic imaging exposure. FIGS. 9A & 9B illustrate one embodiment of an aperture/lens disc 120 in which each set of the f/4 and f/11 sensor apertures 122, 124; 126, 128 are illustrated. The sensor apertures 126 and 128 are covered by suitable close-up lenses 126' and 128'; respectively. In one embodiment, not shown, the circumferential spacing between the respective pairs of apertures 122, 124; and 126, 128 is such as to allow the disc therebetween to, in effect, block light to the CDD sensor 42'; whenever such are positioned at the optical axis. In addition, this circumferential spacing is sufficiently long enough to compensate for vibrations or oscillations of the disc 120 after that latter is stopped from inadvertently moving one of the apertures back to the optical axis whereby it is at least partially in a light admitting position. In such embodiment, the circumferential spacing between the f/4 and f/11 apertures is about two (2) diameters of the f/4 apertures. In the illustrated embodiment, in order to move the disc so as to achieve the shuttering functions, the disc is indexed so that a common location on the disc, which is designated at 131, is the location the disc will be indexed to in order to achieve the capping positions for the f/4 apertures 122, 126, whereby the vibrations or oscillations would not adversely affect shuttering. Positions 132 and 133, as illustrated on the disc, represent locations which represent the locations the disc would be indexed for the capping positions of the f/11 apertures 124 and 128; respectively. To index the disc 120, the latter is provided with a spur gear 130 on one side thereof. The spur gear 130 drivingly meshes with the pinion gear 68' of the stepper motor 66'. It will be understood that the system controller would drive the stepper motor so as to move the disc 120 from a light blocking condition to a light passing condition, wherein one of the sensor apertures is positioned in light passing relationship to the sensor 42' as controlled in the manner described above in connection with the above embodiment. The electronic exposure interval concludes when the stepper motor drives the disc 120 back to one of the positions 131, 132, 133, whereat the disc blocks the scene light to the sensor. The foregoing aperture disc or wheel as described and illustrated, makes provisions for modifying the f-numbers, providing the shuttering functions, as well as for performing close-up functions. The present embodiment contemplates that the aperture disc or wheel can be used in other situations, thereby providing for a compact and less expensive system. For instance, the aperture disc or wheel can be used separately from a shutter in other imaging applications with the close-up lens carried thereby and operatively associated with the aperture. In this latter regard, the present invention envisions that other lens systems can be used as a substitute for or in combination with the close-up lens. These lenses can include those of the focusing, telephoto, or wide angle type.

In operation of this embodiment, the user will commence an exposure cycle wherein the pre-exposure scene and subject measurements are made as indicated. The look-up tables define the exposure algorithms, as noted, which in turn commence the film exposure interval. The strobe will be fired at the correct aperture determined by the look-up table. The CCD sensor 42' will be turned during strobe burn based on the integration of scene light which as noted takes into account the relative differential in area of the film aperture relative to the sensor aperture which is selected. The strobe will quench based on the scene light integration and the shutter mechanism will terminate the film exposure. Since the electronic exposure started later in time than for the film, the electronic exposure will terminate later. In this regard, the stepper motor 66' indexes the disc 120 to a position whereat the sensor aperture is out of alignment with the optical axis and the disc blocks passage of scene light to the CCD sensor 42'. The electronic imaging exposure will close when it has the same effective integrated exposure as the film. As with the other embodiment, when the camera is in an ambient or no strobe mode, the commencing and termination of the film and electronic exposures will be based on time, and there will be no scene light integration for turning the sensor 42' on during strobe burn and quenching the strobe.

Reference is again made to FIG. 10, but this time to describe a method of mounting a circuit board to the module so that the former is properly aligned with respect to the latter. In mounting the board to the module housing, three screws 150, 152 and 154 are used. As will become apparent, this method minimizes significantly the iterative steps which are usually encounter when mounting the board in a desired planar arrangement. In this embodiment, the screw 150 is tightened inwardly relative to board so that the axis of the screw is aligned with one corner 156 of the CCD sensor 42 as illustrated. The screw 152 tightens the board relative to the housing assembly and is located spaced from the sensor so that its axis is perpendicular to a line extending from the corner 156 and along one edge of the sensor 42. The screw 154 tightens the board relative to the housing assembly and is located so that its axis is perpendicular to a line extending from the corner 156 and along another edge of the sensor 42 whereby this line is also perpendicular to the line extending from the corner 156 to the screw 152. It will be noted that the line extending from the screw 152 is perpendicular to the line extending from the screw 154 to the corner 156. In aligning the board and thus the sensor, the first screw 150 is tightened until a cluster of pixels at the corner of the sensor are in focus. Thereafter, the screw 152 is tightened so that the corner 158 of the sensor is in focus; bearing in mind that the corner is in focus; whereby two planes are in proper alignment. The third screw 154 is tightened until the corner 160 of the sensor closest to it is in focus; it will be appreciated that the board and sensor will rotate about the line from the corner 156 to the screw 152. A check of the corners 158, 160 of the sensor is made, should the last tightening step upset the alignment as measured at corner closest to the screw 152, the latter is adjusted and the third screw is again moved until the corner 160 closest to it is in proper focus. Because the sensor is always fixed at one corner as at 156 in this embodiment only the other two need to be adjusted. The screws 152 and 154 are spaced from the sensor corners so as to provide higher precision in adjustment. The foregoing mounting procedure realizes significant gains in the mounting of the sensor in the desired plane perpendicular to the optical axis. To facilitate such mounting of the circuit board a pair of adjustment slots 162, 164 can be provided for accommodating pins 166 extending from the housing assembly and upon which the board is mounted.

Having described the invention with reference to the embodiments above, it will be apparent to those skilled in the art that other variations are possible in accordance with the teachings of the invention. It is, therefore, intended that the description above not be interpreted in a limiting sense.

What is claimed is:

1. A method of obtaining generally matched exposures for at least first and second photoresponsive materials generally concurrently, wherein the first photoresponsive material is more photoresponsive than the second, the method comprising the steps of:

a) deriving an exposure value for a scene subject for the first photoresponsive material in accordance with selected pre-exposure values including a percentage of transient illumination to be contributed to the exposure value;

b) selecting an effective aperture for the second photoresponsive material which has a preselected ratio to the first effective aperture which is generally equal to or proportionally larger than the effective aperture for the first photoresponsive material;

c) determining the equivalent exposure time for the second photoresponsive material given the selected effective aperture of the second photoresponsive material;

d) commencing an exposure interval for the first photoresponsive material and defining changing aperture values for effecting exposure of the first photoresponsive material;

e) firing a pulse of transient illumination at a selected effective aperture for the first photoresponsive material f) commencing an exposure interval for the second photoresponsive material during the pulse of transient illumination at a point based on said percentage of transient illumination to be contributed to the first photoresponsive material and the preselected ratio of effective apertures; and, g) terminating the exposure interval for the first and second photoresponsive materials to thereby generally match the exposures of the first and second photoresponsive materials.

2. The method of claim 1 wherein the selected pre-exposure values include a measurement of scene brightness.

3. The method of claim 1 wherein the selected pre-exposure values include a measurement of subject range.

4. The method of claim 1 wherein the selected pre-exposure values include a measurement of scene brightness and subject range.

5. The method of claim 1 wherein the terminating step includes quenching the pulse of transient illumination at a point whereat the exposure values of the first and second photoresponsive materials are generally matched.

6. The method of claim 3 wherein the first photoresponsive material is a photographic film.

7. The method of claim 3 wherein the second photoresponsive material is a solid-state sensor.

8. The method of claim 3 wherein said terminating step includes mechanically blocking the effective apertures of the first and second materials after a predetermined interval following commencement of the pulse of transient illumination.

9. A system for obtaining generally matched exposures for at least first and second photoresponsive materials generally concurrently, wherein the first photoresponsive material is more photoresponsive than the second, the system comprising: means for deriving an exposure value for a scene subject for the first photoresponsive material in accordance with selected pre-exposure values including a percentage of transient illumination to be contributed to the exposure value; means for selecting an effective aperture for the second photoresponsive material which has a preselected ratio to the first effective aperture which is generally equal to or proportionally larger than the effective aperture for the first photoresponsive material; means for determining the equivalent exposure time for the second photoresponsive material given the selected effective aperture of the second photoresponsive material; means for commencing an exposure interval for the first photoresponsive material and defining changing aperture values for effecting exposure of the first photoresponsive material; means for firing a pulse of transient illumination at a selected effective aperture for the first photoresponsive material; means for commencing an exposure interval for the second photoresponsive material during the pulse of transient illumination at a point based on said percentage of transient illumination to be contributed to the first photoresponsive material and the preselected ratio of effective apertures; and, means for terminating the exposure interval for the first and second photoresponsive materials to thereby generally match the exposures of the first and second photoresponsive materials.

10. The system of claim 9 wherein the means for selecting pre-exposure values includes means for measuring at least a measurement of scene brightness and/or subject range.

11. The system of claim 9 wherein the means for terminating includes means for quenching the pulse of transient illumination at a point whereat the exposure values of the first and second photoreponsive materials are generally matched.

12. The system of claim 9 wherein the first photoresponsive material is a photographic film.

13. The system of claim 9 wherein the second photoresponsive material is a solid-state sensor.

14. The system of claim 11 wherein the means for terminating includes means for mechanically blocking the effective apertures of the first and second materials after a predetermined interval following commencement of the pulse of transient illumination.

15. An electronic image acquisition apparatus comprising: a housing assembly; a flash unit operable for generating a pulse of transient illumination during an exposure interval; means for deriving an exposure value for a scene in accordance with selected pre-exposure values; a solid-state image acquisition means in the housing assembly operable for generating still-image signals representative of scene light incident thereon; a lens assembly disposed on the housing assembly for directing scene light along an optical path to the image acquisition means; means for controlling scene light incident on the acquisition means in an amount corresponding to the exposure value; the control means including at least one rotatable shutter mechanism having at least one preselected aperture which selectively moves into the scene light path, and means for activating the acquisition means during a preselected proportion of the pulse of illumination in order to achieve the exposure value.

16. The apparatus of claim 15 wherein the shutter mechanism includes at least a pair of apertures of different dimensions with respect to each other and including a close-up lens associated with one of the apertures.

17. The apparatus of claim 16 wherein the shutter mechanism is operated by a digital motor.

18. The apparatus of claim 16 wherein the image acquisition means includes a charge couple device.

19. The apparatus of claim 16 wherein a portion of the rotatable shutter mechanism extends into the housing assembly for rotational movement whereby each one of the shutter apertures can be selectively moved into and out of the optical path.

* * * * *